US007029049B2

(12) United States Patent
Rockafellow et al.

(10) Patent No.: US 7,029,049 B2
(45) Date of Patent: Apr. 18, 2006

(54) ADJUSTABLE ARMREST

(75) Inventors: Brent D. Rockafellow, Holland, MI (US); Jason M. Hipshier, Hudsonville, MI (US); Kenneth D. Sherburn, Grand Rapids, MI (US); Sheldon Watjer, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 265 days.

(21) Appl. No.: 10/481,682

(22) PCT Filed: Jun. 19, 2002

(86) PCT No.: PCT/US02/19500

§ 371 (c)(1), (2), (4) Date: Dec. 19, 2003

(87) PCT Pub. No.: WO02/102619

PCT Pub. Date: Dec. 27, 2002

(65) Prior Publication Data

US 2004/0206858 A1 Oct. 21, 2004

Related U.S. Application Data

(60) Provisional application No. 60/299,365, filed on Jun. 19, 2001.

(51) Int. Cl.
*B60N 3/12* (2006.01)

(52) U.S. Cl. ..................................... 296/37.8; 296/1.09

(58) Field of Classification Search ............... 296/37.8, 296/1.09, 24.34

See application file for complete search history.

(56) References Cited

U.S. PATENT DOCUMENTS

| | | | |
|---|---|---|---|
| 1,490,538 | A | 4/1924 | Owen |
| 2,160,282 | A | 5/1939 | Rehg |
| 2,524,909 | A | 10/1950 | Hines |
| 2,633,180 | A | 3/1953 | Reed |
| 2,678,682 | A | 5/1954 | Thomas |
| 3,104,131 | A | 9/1963 | Krone |

(Continued)

FOREIGN PATENT DOCUMENTS

| | | |
|---|---|---|
| DE | 2017937 | 10/1971 |

(Continued)

OTHER PUBLICATIONS

Copy of the International Search Report, based on International Application No. PCT/US02/19500, date of mailing of the International Search Report Oct. 29, 2002 (4 pages).

*Primary Examiner*—Kiran B. Patel
(74) *Attorney, Agent, or Firm*—Foley & Lardner LLP

(57) ABSTRACT

An armrest mounted to a base and a method of inhibiting the movement of an armrest is disclosed. The armrest comprises an armrest support member adapted to be coupled to the base, the armrest support member being movable in a linear direction between a first position and a second position. The armrest also includes a release mechanism configured to selectively engage the armrest support member to retain the armrest support member between the first position and the second position. The method comprises operating the user interface to reduce friction between the cam and the rail sufficient to permit movement of the armrest support member, moving the armrest support member between the forward position and the rearward position, and releasing the user interface whereby the cam applies sufficient friction to inhibit movement of the armrest support member.

29 Claims, 16 Drawing Sheets

U.S. PATENT DOCUMENTS

| | | | | | |
|---|---|---|---|---|---|
| 3,177,033 | A | | 4/1965 | Daniels | |
| 3,356,409 | A | | 12/1967 | Belsky et al. | |
| 3,926,473 | A | | 12/1975 | Hogan | |
| 3,951,448 | A | | 4/1976 | Hawie | |
| 4,027,916 | A | | 6/1977 | McElroy | |
| 4,040,659 | A | | 8/1977 | Arnold | |
| 4,052,103 | A | | 10/1977 | Steinthal | |
| 4,146,159 | A | | 3/1979 | Hemmen | |
| 4,159,145 | A | | 6/1979 | Quakenbush | |
| 4,417,764 | A | | 11/1983 | Marcus et al. | |
| 4,453,759 | A | * | 6/1984 | Kathiria | 296/37.8 |
| 4,496,190 | A | | 1/1985 | Barley | |
| 4,512,503 | A | | 4/1985 | Gioso | |
| 4,648,651 | A | | 3/1987 | Hawkes | |
| 4,756,459 | A | | 7/1988 | Hardman | |
| 4,779,923 | A | | 10/1988 | Lang et al. | |
| 4,842,175 | A | | 6/1989 | Towsend | |
| 4,848,840 | A | | 7/1989 | Toya | |
| 4,867,500 | A | | 9/1989 | Oosterbaan et al. | |
| 4,887,866 | A | | 12/1989 | Rusin | |
| 4,906,044 | A | | 3/1990 | Wilstermann | |
| 4,934,750 | A | | 6/1990 | Eichler et al. | |
| 4,941,718 | A | | 7/1990 | Alexander, III et al. | |
| 4,969,686 | A | | 11/1990 | Germain | |
| 5,320,414 | A | | 6/1994 | Spykerman et al. | |
| 5,380,065 | A | | 1/1995 | Rohrer | |
| 5,393,125 | A | * | 2/1995 | Watson et al. | 297/411.36 |
| 5,433,509 | A | | 7/1995 | Hotary et al. | |
| 5,489,054 | A | | 2/1996 | Schiff | |
| 5,634,537 | A | * | 6/1997 | Thorn | 297/344.13 |
| 5,676,483 | A | * | 10/1997 | Koubek | 297/411.36 |
| 5,732,994 | A | | 3/1998 | Stancu et al. | |
| 5,749,629 | A | * | 5/1998 | Heath et al. | 297/411.36 |
| 5,769,497 | A | * | 6/1998 | Tsai | 297/411.36 |
| 5,845,965 | A | * | 12/1998 | Heath et al. | 297/411.35 |
| 5,853,223 | A | * | 12/1998 | Ritt et al. | 297/411.36 |
| 5,984,416 | A | | 11/1999 | Waldo et al. | |
| 6,003,927 | A | * | 12/1999 | Korber et al. | 296/37.8 |
| 6,039,296 | A | | 3/2000 | Nishina et al. | |
| 6,045,173 | A | * | 4/2000 | Tiesler et al. | 296/37.8 |
| 6,050,634 | A | * | 4/2000 | Yamagishi et al. | 297/411.36 |
| 6,076,892 | A | * | 6/2000 | van Hekken et al. | 297/411.35 |
| 6,139,107 | A | * | 10/2000 | Lee | 297/411.36 |
| 6,168,059 | B1 | * | 1/2001 | Salenbauch et al. | 296/37.8 |
| 6,213,546 | B1 | | 4/2001 | Malusev et al. | |
| 6,296,312 | B1 | * | 10/2001 | Congleton et al. | 297/411.35 |
| 6,394,553 | B1 | * | 5/2002 | McAllister et al. | 297/411.36 |
| 6,419,314 | B1 | * | 7/2002 | Scheerhorn | 296/37.8 |
| 6,659,561 | B1 | * | 12/2003 | Lee | 297/411.35 |
| 6,719,367 | B1 | * | 4/2004 | Mic et al. | 296/37.8 |
| 6,755,275 | B1 | * | 6/2004 | Okanda | 180/329 |
| 6,773,072 | B1 | * | 8/2004 | Phillips et al. | 297/411.35 |
| 6,932,402 | B1 | * | 8/2005 | Niwa et al. | 296/1.09 |
| 6,957,866 | B1 | * | 10/2005 | Cai | 297/411.35 |

FOREIGN PATENT DOCUMENTS

| | | | |
|---|---|---|---|
| DE | 1680081 | | 3/1972 |
| DE | 2632355 | A1 | 2/1977 |
| DE | 2602884 | | 7/1977 |
| DE | 2605449 | | 8/1977 |
| DE | 2635408 | | 2/1978 |
| DE | 2723148 | A1 | 11/1978 |
| DE | 2723149 | A1 | 11/1978 |
| DE | 3046049 | A1 | 7/1982 |
| DE | 3143957 | A1 | 5/1983 |
| DE | 8437440 | | 3/1985 |
| DE | 8601245 | U1 | 4/1986 |
| DE | 3529957 | | 3/1987 |
| DE | 3544491 | C1 | 6/1987 |
| DE | 3626897 | A1 | 2/1988 |
| DE | 8903383 | U1 | 6/1989 |
| DE | 3824804 | C1 | 7/1989 |
| DE | 9215936 | | 3/1993 |
| DE | 4415732 | A1 | 11/1995 |
| DE | 20205029 | U1 | 10/2002 |
| EP | 0638459 | B1 | 2/1995 |
| EP | 1225089 | A2 | 7/2002 |
| FR | 1202780 | | 1/1960 |
| FR | 2391608 | | 12/1978 |
| FR | 2391681 | | 12/1978 |
| FR | 2716786 | A1 | 9/1995 |
| FR | 2724609 | A1 | 3/1996 |
| FR | 2810596 | | 12/2001 |
| FR | 2810596 | A1 | 12/2001 |
| GB | 1497443 | | 1/1978 |
| GB | 2222518 | A | 3/1990 |
| JP | 58-180339 | | 10/1983 |
| JP | 59-067129 | | 4/1984 |
| WO | WO 02/102619 | A1 | 12/2002 |

* cited by examiner

ADJUSTABLE ARMREST

CROSS-REFERENCE TO RELATED PATENT APPLICATIONS

The present invention claims priority from PCT Patent Application No. PCT/US02/19500 filed Jun. 19, 2002, which claims priority from U.S. Provisional Patent Application No. 60/299,365 titled "Adjustable Armrest" filed Jun. 19, 2001, the full disclosure of which are hereby incorporated herein by reference.

BACKGROUND OF THE INVENTION

The present invention relates to an armrest. More particularly, the present invention relates to an armrest that is adjustable between a forward position and a rearward position, and retained in place by a retaining mechanism.

Armrests in vehicles such as automobiles are generally known. Such known armrests are sometimes pivotable to expose a storage compartment (e.g., a bin), but are not otherwise movable or adjustable. Additionally, placement and size of known armrests are designed to accommodate a deviation covering most adults. However, many occupants (or users of these armrests) are unable to enjoy the full use of known armrests because they fall outside the deviation it is designed to accommodate. Also, many users of known armrests would prefer a different configuration of their armrest, instead of that which has been designed "for" them.

To provide an inexpensive, reliable, and widely adaptable adjustable armrest that avoids the above-referenced and other problems would represent a significant advance in the art.

SUMMARY OF THE INVENTION

A primary feature of the present invention is to provide an inexpensive, easy-to-manufacture and aesthetically-pleasing infinitely adjustable armrest that overcomes the above-noted disadvantages.

Another feature of the present invention is to provide an armrest that provides for translational adjustment forward and rearward of a vehicle.

Another feature of the present invention is to provide an adjustable armrest with a cam mechanism that provides for sturdy and easy adjustment.

How these and other advantages and features of the present invention are accomplished (individually, collectively, or in various subcombinations) will be described in the following detailed description of the preferred and other exemplary embodiments, taken in conjunction with the FIGURES. Generally, however, they are accomplished in an armrest mounted to a base. The armrest comprises an armrest support member adapted to be coupled to the base, movable in a linear direction between a first position and a second position. The armrest also comprises a release mechanism configured to selectively engage the armrest support member to retain the armrest support member between the first position and the second position.

These and other advantages and features of the present invention may also be accomplished in a vehicle console. The vehicle console comprises a base, an armrest support member coupled to the base and movable in a linear direction between a first position and a second position, a release mechanism configured to selectively engage the armrest support member to retain the armrest support member between the first position and the second position. The armrest support member is frictionally retained at any point along a range of movement thereof.

These and other advantages and features of the present invention may also be accomplished in an armrest mounted to a base. The armrest comprises an armrest selectively positionable relative to the base, means such as a device for retaining the armrest in a selected position, and means such as a device for releasing the armrest from the elected position.

These and other advantages and features of the present invention may also be accomplished in a method of inhibiting the movement of an armrest that includes a base, an armrest support member movable between a forward position and a rearward position, and a release mechanism having a user interface and a cam operatively coupled to a rail. The method comprises operating the user interface to reduce friction between the cam and the rail sufficient to permit movement of the armrest support member, moving the armrest support member between the forward position and the rearward position, releasing the user interface whereby the cam applies sufficient friction to inhibit movement of the armrest support member.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

Figure 1:
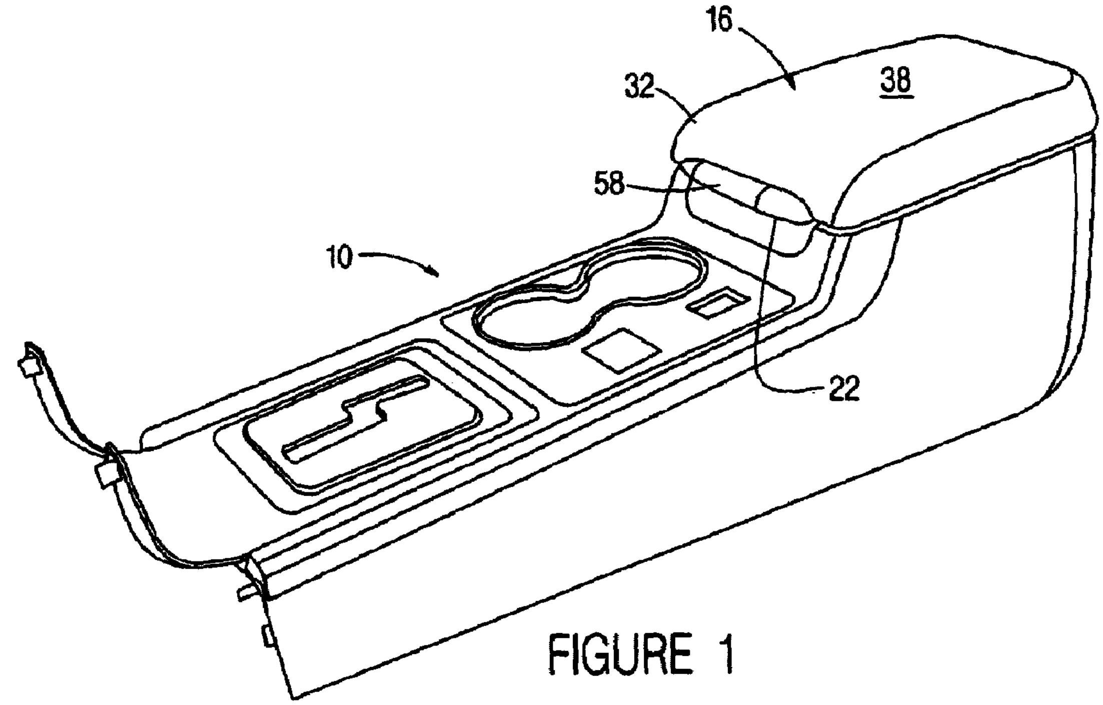
FIG. 1 is a perspective view of a console with an adjustable armrest in a stowed or rearward position according to an exemplary embodiment.

Before explaining a number preferred, exemplary, and alternative embodiments of the invention in detail it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION OF THE PREFERRED EMBODIMENTS

Before proceeding to the detailed description of the preferred and exemplary embodiments, several comments can be made about the general applicability and the scope thereof. For example,while the components of the disclosed embodiments will be illustrated as a adjustable armrest designed for a center console in an automobile, the features of the disclosed embodiments have a much wider applicability. For example, the adjustable armrest design is adaptable for other types of vehicles, for other locations within a vehicle (e.g., along a door, in the rear passenger compartment), for seating arrangements not located in vehicles (e.g., movie theaters, and other office, home, or educational seating arrangements which employ an armrest). Further, the size of the various components and the size of the armrests can be widely varied.

Also, the particular materials used to construct the exemplary embodiments are also illustrative. For example, injection molded polycarbonate is the preferred method and material for making the substrate, but other materials can be used, including other thermoplastic resins such as polypropylene, other polyethylenes, acrylonitrile butadiene styrene ("ABS"), polyurethane nylon, any of a variety of homopolymer plastics, copolymer plastics, plastics with special additives, filled plastics, etc. Also, other molding operations may be used to form these components, such as blow molding, rotational molding, etc. Components of the armrest can also be manufactured from other alloy materials such as steel or aluminum (e.g., stamped, cast, milled, machined, powdered metal, etc.). Also, the material selection is dependent on the desired strength and the intended performance of the adjustable armrest.

Further, the guide mechanisms or slide assemblies may be any of a variety of devices or designs configured to provide a sliding or lateral translational movement (e.g., dove-tail joint, conventional door or drawer slides, greased (or ungreased) member on member interface (e.g., plastic on plastic, plastic on metal, metal on metal, etc.), pneumatic or hydraulic cylinder, and the like.

Further, it is important to note that the term "armrest," "cam mechanism," "liner," and "substrate" are intended to be broad terms and not terms of limitation. These components may be used with any of a variety of products or arrangements and are not intended to be limited to use with automobile or even vehicle applications.

Figure 2:
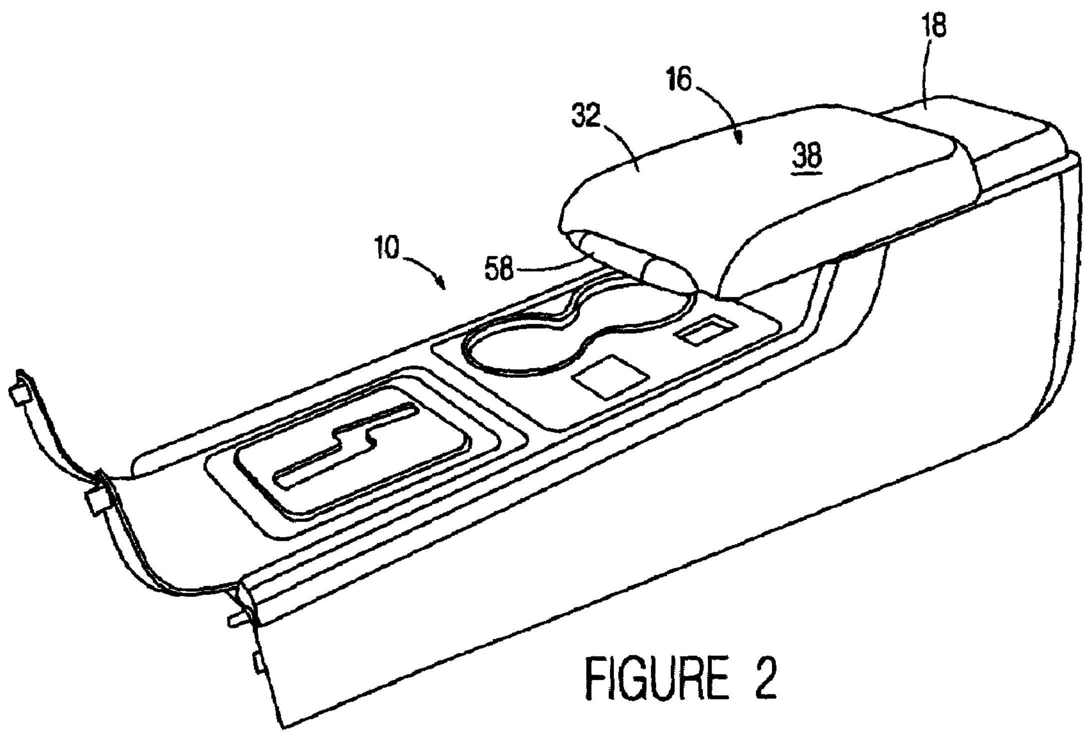
FIG. 2 is a perspective view of a console with the adjustable armrest of FIG. 1 but in a deployed or forward position.
Figure 3:
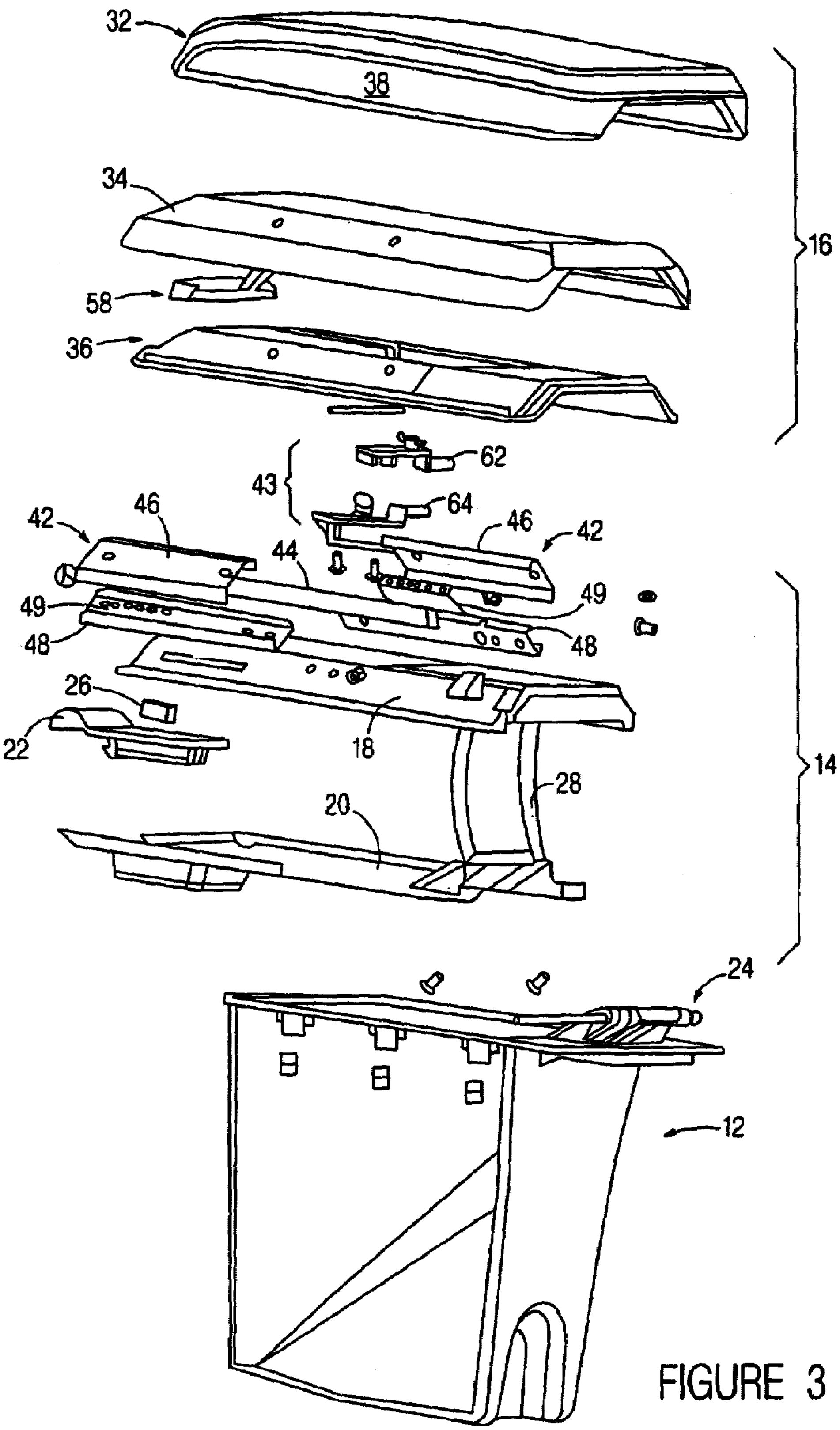
FIG. 3 is an exploded view of the console with an adjustable armrest of FIG. 1.

Proceeding now to descriptions of the preferred and exemplary embodiments, FIGS. 1 and 2 show a center console 10 for a vehicle. FIG. 3 shows an exploded view of the armrest and bin assembly. Center console 10 includes a bin 12, a liner assembly 14 pivotally coupled to bin 12, and an armrest assembly configured to move between a forward position (FIG. 2) and a rearward position (FIG. 1) (e.g., telescope). Bin 12 may have any of a variety of conventional configurations and orientations. Alternatively, console 10 does not have a "bin" and yet still includes an adjustable armrest.

Liner assembly 14 includes a liner 18, a liner cover 20, and a bin latch 22. Liner 18 is pivotally coupled to bin 12 by a hinge 24. Bin latch 22, biased by a coil spring 26, releasably engages bin 12 so that liner 18 can be pivoted between an open position and a closed position. A hinge stop 28 is rigidly coupled at one end to a bottom surface 30 of liner 18 and is configured to limit the pivotal movement of liner 18 (e.g., to prevent damage to liner 18 or hinge 24). Liner cover 20 is attached to bottom surface 30 of liner 18 and is configured to provide an aesthetic view when liner 18 is pivoted to an open position.

Figure 4:
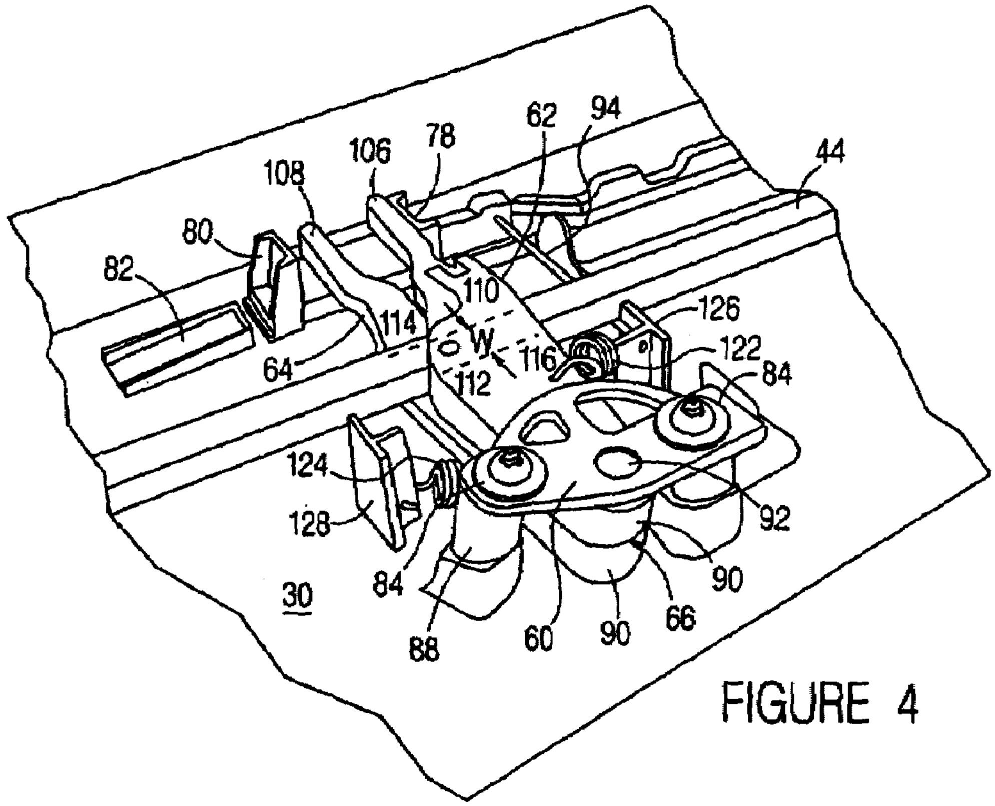
FIG. 4 is a perspective view of the adjustable armrest with the release mechanism in a rearward actuated position.
Figure 5:
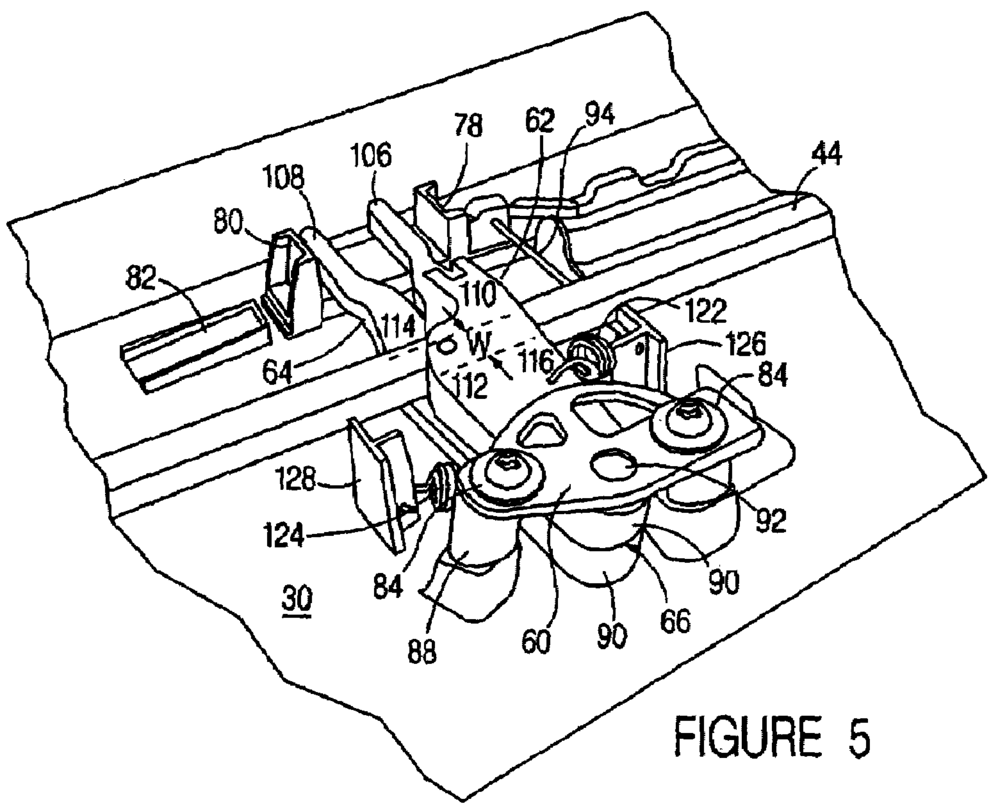
FIG. 5 is a perspective view of the adjustable armrest with the release mechanism in a frontward or forward biased position.

Referring to FIGS. 3–5, an armrest assembly 16 is shown according to an exemplary embodiment. Armrest 16 is slidably coupled to liner 18 and includes an armrest support member comprising an armrest cover 32, a substrate 34, and a retainer 36. Armrest cover 32 is attached to substrate 34 and includes a cover sheet 38 (e.g., a sheet made from vinyl, leather, plastic, etc.) and a pad (e.g., foam, cellulose, etc.) (not shown). Retainer 36 is configured to secure cover sheet 38 to substrate 34, and includes a series of conical points (e.g., "sharks" teeth) that press cover sheet 38 into a channel 39 on substrate 34. Retainer 36 and cover sheet 38 are further secured by fasteners coupled to a series of bosses 40 on bottom side 30 of substrate 34.

Substrate 34 is slidably coupled to liner 18 by a pair of guides 42 (shown as slider tracks), and by a cam mechanism 43 engaged with a rail 44. Substrate 34 is configured to move between a stowed position (see FIG. 1) and a deployed position (see FIG. 2).

Guides 42 have a conventional design and are configured to provide for smooth movement of substrate 34 relative to liner 18, and to provide support for forces exerted on armrest—particularly when substrate 34 is in the deployed position. Guides 42 includes a first track 46 coupled to substrate 34, a second track 48 coupled to liner 18, and a bearing 49 located between first track 46 and second track 48. Guides 42 may be attached to liner 18 and substrate 34 using any of a variety of conventional methods (e.g., rivets, fasteners, heat staking, etc.).

Ends 50, 52 of rail 44 are mounted in channels 54, 56 in liner 18 and secured in place by fasteners (not shown). Cam mechanism 43 is selectively slidably coupled to rail 44. Rail 44 may have any of a variety of configurations (e.g., square, rectangular, circular, elliptical, etc.). Rail 44 may be attached to liner 18 and substrate 34 using any of a variety of conventional methods (e.g., rivets, fasteners, heat staking, etc.).

Cam mechanism 43 includes a latch 58, a bracket 60 (shown as a cam pivot bracket), and a pair of brake or cam members (shown as an upper cam member 62 and a lower cam member 64). Upper and lower cam members 62, 64 are pivotally coupled at one end 66 to bottom side 30 of substrate 34. According to alternative embodiments, upper and lower cams 62, 64 are not coupled at a single pivot or axle or axis. Upper and lower cams 62, 64 may be staggered and/or mounted at different pivots or axes or axles.

Latch 58 includes a user interface (shown as a grip or handle 68), a middle portion 70, and a rearward extending flange 72. Handle 68 is generally disposed in a recess at a forward end of substrate 34 and is configured to be readably accessible to the user. Middle portion 70 includes a pair of opposing flanges 74 that slidably engage guides or tracks 76 formed by a plurality of projections extending from bottom side 30 of substrate 34.

Flange 72 includes a pair of spaced apart projections 78, 80 extending away from bottom side 30 of substrate 34. Projections 78, 80 are configured to engage upper cam member 62 or lower cam member 64 as latch 58 is slid rearward (FIG. 4) or frontward (FIG. 5). A stop 82 extends from bottom surface 30 of substrate 34 to prevent latch 58 from being slid too far rearward.

Bracket 60 is mounted with fasteners 84 to a pair of bosses 88 extending from bottom side 30 of substrate 34. Ends 66 of cam members 62, 64 include a boss 90 configured to receive and pivot about an axle 92 extending from bottom side 30. Bracket 60 is configured to secure upper and lower cam members 62, 64 on axle 92 and secures spring 94 to substrate 34.

A biasing member 94 (shown as a straight wire spring) is configured to move latch 58 to a neutral position wherein the cam members are not engaged by projections. Biasing member 94 may be any of a variety of devices configured to apply a force to latch. End 96 of biasing member 94 is coupled to flange 72 of latch 58. Other end 98 of biasing member 94 is coupled to a projection 100 extending from bottom side 30 of substrate 34. Preferably, the middle portion of biasing member 94 is disposed between a pair of projections forming a slot 102 extending from bottom side 30. Bracket 60 includes an arm 104 extending below and towards latch 58. Arm 104 is configured to keep biasing member 94 in projection 100 and slot 102.

Upper and lower cam members 62, 64 include arms 106, 108 that extend away from ends 66, and are disposed between spaced apart projections 78, 80. Upper and lower cam members 62, 64 also include a plurality of cam surfaces (cam surfaces 110, 112 on upper cam member 62 and 114, and cam surface 116 on lower cam member 64) which are configured to selectively engage rail 44. On upper cam member 62, cam surface 110 is provided by end of arm 106, and cam surface 112 is provided by a boss 118. On lower cam member 64, cam surface 114 is provided by end of arm 108, and cam surface 116 is provided by a boss.

According to a preferred embodiment, bosses 90 of upper and lower cam members 62, 64 include elliptical slots 121 (shown in FIG. 14) that receive axle 92. Slots 121 is configured to allow the cam member to move (e.g., translate) generally perpendicular to rail 44. Such a slotted construction is intended to accommodate assembly tolerances, to improve the frictional engagement of the cam surfaces and the rail. According to a particularly preferred embodiment, upper cam member 62 and lower cam member 64 are configured to rotate about the axis of rail 44 (i.e., due to pivoting about axle 92 and movement in slot 121).

Braking or frictional engagement of rail by upper and lower cam members 62, 64 is provided by the spacial relationship (i.e., width W) between cam surfaces 110 and 112 or between cam surfaces 114 and 116—depending on the direction of force exerted on substrate 34. Width W is a dimension perpendicular to a longitudinal axis of rail 44 and is determined by the relative pivotal position of upper and lower cam members 62, 64.

The braking or friction force between upper cam member 62 and rail 44 (or between lower cam member 64 and rail 44) is generated when a force (rearward or frontward) is exerted on substrate. For example, when a rearward force is exerted on substrate 34, the force is transferred through axle 92 to upper cam member 62. Upper cam member 62 then pivots about axle 92 and translates in slot 121 so that the width W between cam surfaces 110 and 112 decreases, thereby providing a locking/braking/friction force to resist movement of substrate 34. When a frontward force is exerted on substrate 34, the force is transferred through axle 92 to lower cam member 64. Lower cam member 64 then pivots about axle 92 and translates in slot 121 so that the width W between cam surfaces 114 and 116 decreases, thereby providing a locking/braking/friction force to resist movement of substrate 34.

When movement of substrate 34 is desired, latch 58 is operated to pivot and translate upper cam member 62 or lower cam member 64 about axle 92 and slot 121 so that width W between cam surfaces 110 and 112 (or between cam surfaces 114 and 116) increases, thereby reducing the locking/braking/friction force and allow movement of substrate 34. As such, the selective positioning of cam mechanism 43 along rail 44 provides for an infinite amount of adjustability.

Upper and lower cam members 62, 64 are biased to provide a braking or friction force to rail 44. According to a preferred embodiment, a pair of springs 122, 124 are configured to pivotally bias arms 106, 108 away from each other so that a braking or friction force is applied to rail 44 by surfaces 110, 112, 114, 116. Applied force is intended to ensure contact of surfaces 110, 112, 114, 116 to rail 44. Spring 122 is coupled at one end to upper cam member 62 and at the other end to a projection 126 extending from bottom side 30 of substrate 34. Spring 124 is coupled at one end to lower cam member 64 and at another end to a projection 128 extending from bottom side 30. As such, cam mechanism 43 secures substrate 34 in place relative to liner 18. To release the friction force, arms 106, 108 are pivoted toward each other.

According to a preferred embodiment, arms 106, 108 are pivoted toward each other by sliding latch 58 either forward or rearward. Upon a sufficient reduction in the friction force, substrate 34 is movable forward along rail 44 when latch 58 is moved forward. Likewise, upon a sufficient reduction in the friction force, substrate 34 is movable rearward along rail 44 when latch 58 is moved rearward. Referring to FIG. 5, by sliding latch 58 forward, projection 80 applies a force to arm 108 to pivot lower cam member 64 toward upper cam member 62, thereby reducing the braking force or friction being applied to rail 44 so that substrate is slidable forward. Referring to FIG. 4, by sliding latch 58 rearward, projection 78 applies a force to arm 106 to pivot upper cam member 62 toward lower cam member 64, thereby reducing the friction force being applied to rail 44 so that substrate is slidable rearward.

According to an exemplary embodiment, braking or friction engagement of rail 44 by upper and lower cam members 62, 64 is provided by the spatial relationship (i.e., width W) between cam surfaces 110, 112 and cam surfaces 114, 116. For example, the farther arms 106, 108 are pivoted away from each other, the smaller width W becomes (i.e., cam surface 110 on upper cam member 62 gets closer to cam surface 116 on lower cam member 64; and cam surface 112 on upper cam member 62 gets closer to cam surface 114 on lower cam member 64). Likewise, the closer arms 106, 108 are pivoted toward each other, the larger width W becomes (i.e., cam surface 110 on upper cam member 62 separates from cam surface 116 on lower cam member 64; and cam surface 112 on upper cam member 62 separates from cam surface 114 on lower cam member 64).

Alternatively, upper and lower members 62, 64 are biased to provide a braking or friction force to rail 44. According to a preferred embodiment, a pair of springs 122, 124 are configured to pivotally bias arms 106, 108 away from each other. Spring 122 is coupled at one end to upper cam member 62 and at the other end to a projection 126 extending from bottom side 30 of substrate 34. Spring 124 is coupled at one end to lower cam member 64 and at another end to a projection 128 extending from bottom side 30. As such, cam mechanism 43 secures substrate 34 in place relative to liner 18. To release the braking force, arms 106, 108 are pivoted toward each other.

According to an alternative embodiment, the cam mechanism may have a pair of opposing cam members (rather than stacked upper and lower cam members). Opposing cam members is intended to provide for a thinner substrate profile.

Referring to FIGS. 6–20, an armrest assembly 160 is shown according to a preferred embodiment. Armrest assembly 160 is slidably coupled to liner 18 and includes an armrest support member comprising an armrest cover attached to a substrate 164. Substrate 164 is the "backbone" that the components on the moving half (the armrest support member) of the armrest are attached to, and is configured to move between a stowed position (see FIG. 1) and a forward or rearward or deployed position (see FIG. 2).

Figure 6:
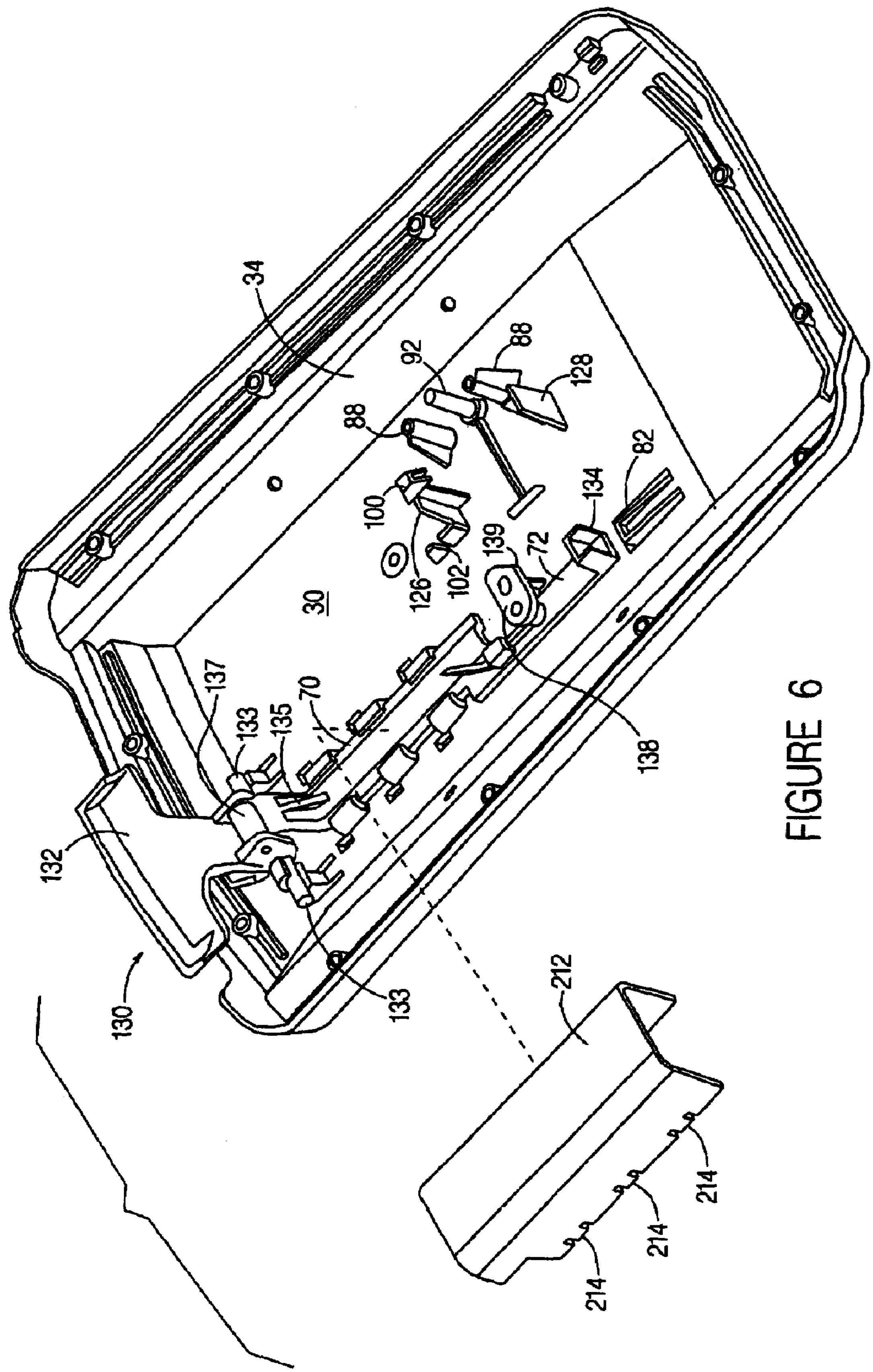
FIG. 6 is a partially exploded perspective view of the adjustable armrest according to a preferred embodiment.
Figure 7:
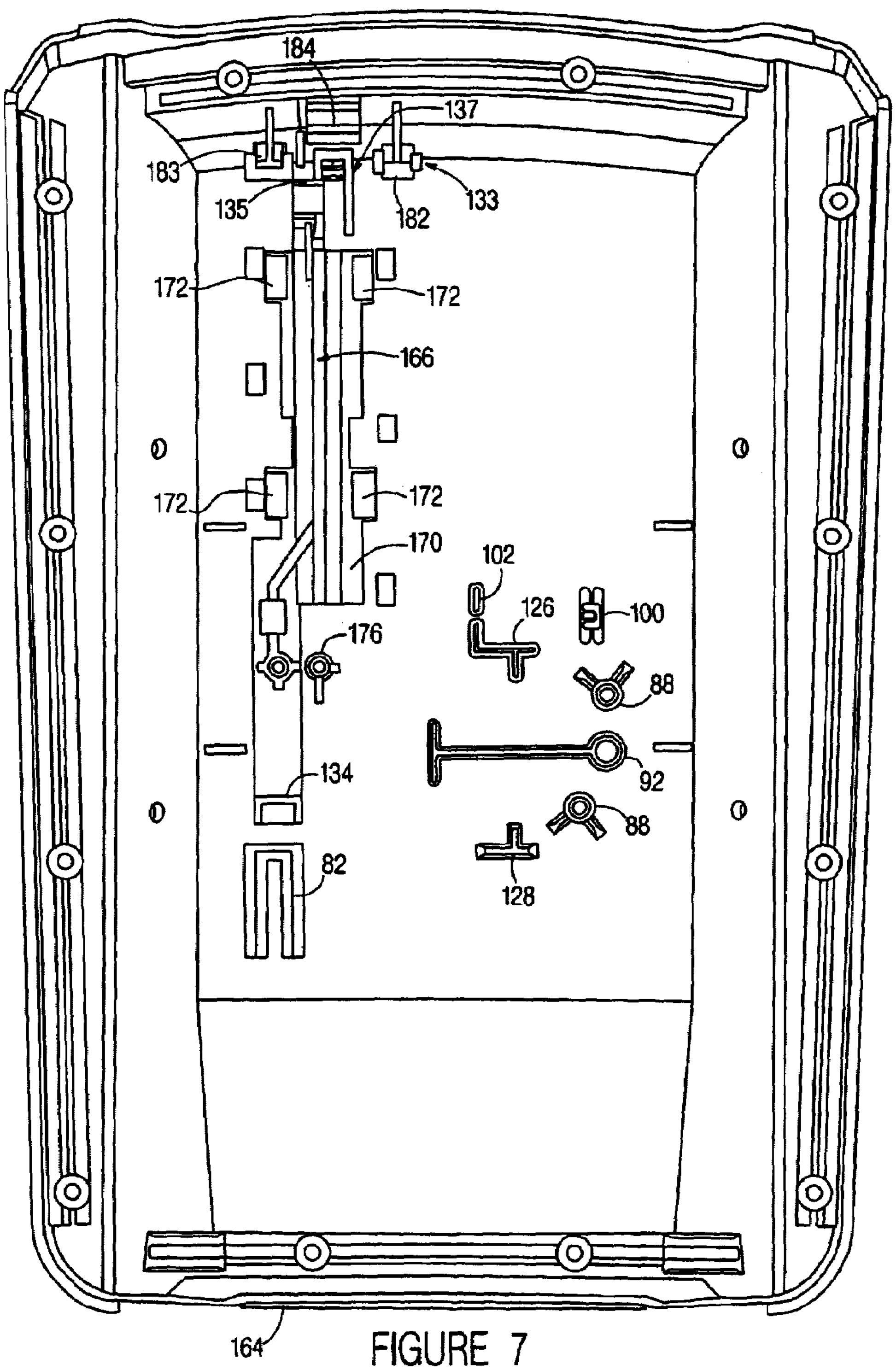
FIG. 7 is a top plan view of a slider and latch spring mounted to a substrate.
Figure 9:
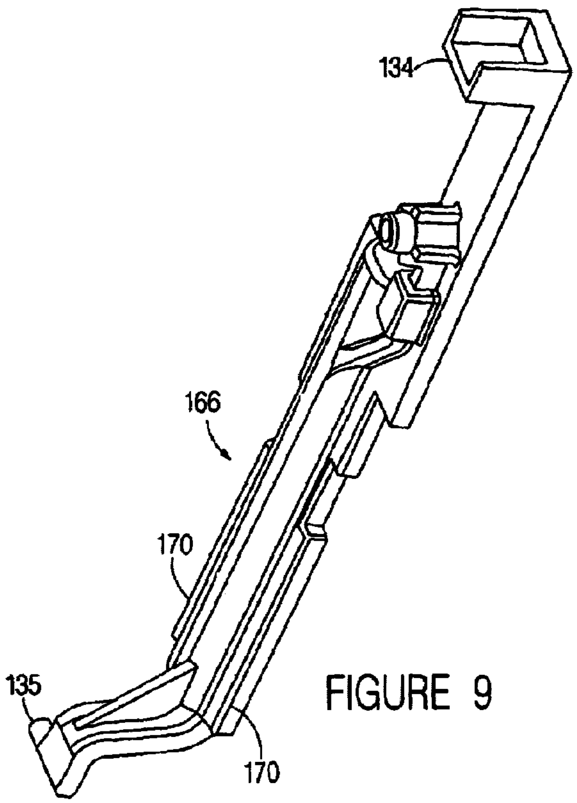
FIG. 9 is a perspective view of the slider.

Referring to FIGS. 6, 7, and 9, a sliding member or slider 166 is slidably coupled to substrate 164 and is configured to move forward (or backward) when latch 130 is actuated or released, thereby activating or releasing a rear cam 168 (and indirectly front cam 188). Slider 166 includes a pair of lateral flanges 170 that are captured by a plurality of projections or hooks 172 extending from the bottom surface of substrate 164. Slider 166 slides along the bottom surface of substrate-164 while remaining engaged by hooks 172.

Figure 11:
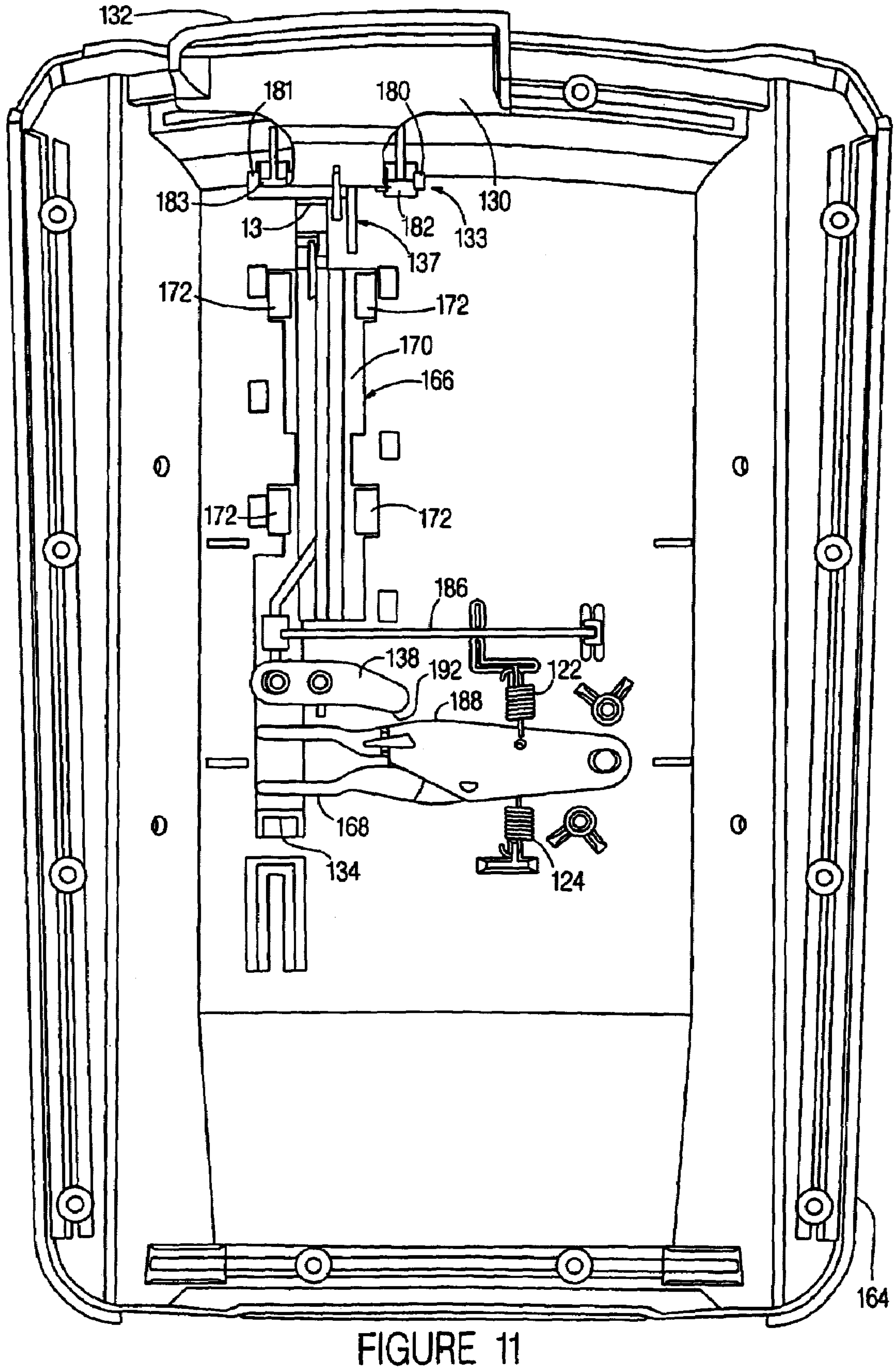
FIG. 11 is a top plan view of a cam actuator, latch, cams, and cam springs mounted to the armrest support member.
Figure 13:
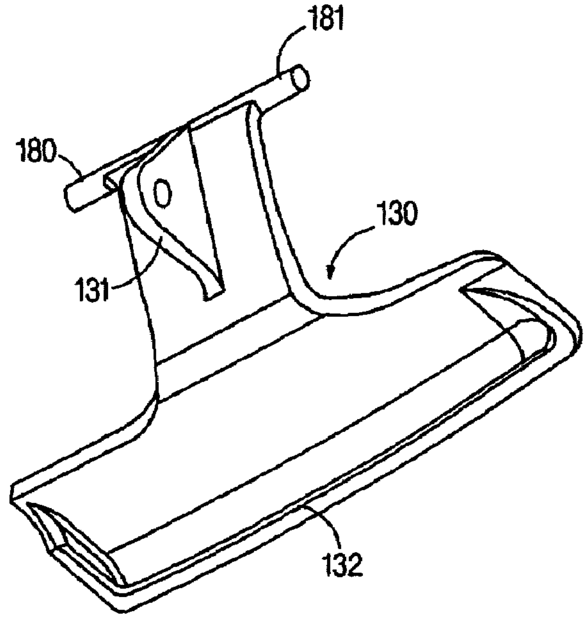
FIG. 13 is a perspective view of the latch.

Referring to FIGS. 6, 11, and 13, latch 130 is configured to be a user interface that activates/releases a release mechanism (e.g., a retaining or locking mechanism). Latch 130 is coupled to substrate 164 about a first pivot point 133, and to slider 166 about a second pivot point 137. Latch 130 is coupled to slider 166 by a pivot flange 131 extending from latch 130 (e.g., by a fastener such as a screw, rivet, press-in or—fit fastener, or the like). Operation of latch 130 pivots latch 130 about first pivot point 133, which causes lateral movement in slider 166 by the coupling of a pivot member 135 to pivot flange 131 at second pivot point 137. Latch 130 is retained by a pair of projections 180, 181 captured (completely or partially) by a pair of flanges 182, 183 extending from the bottom surface of substrate 164. Preferably, one of the projections 180 is surrounded substantially or completely by a first flange 182, and the other projection 180 is partially retained or captured by the other flange 183 (e.g., to assist in assembly, or the like).

Figure 10:
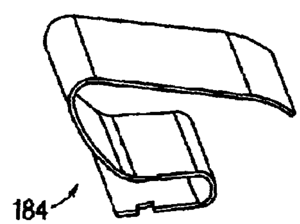
FIG. 10 is a perspective view of the latch spring.
Figure 8:
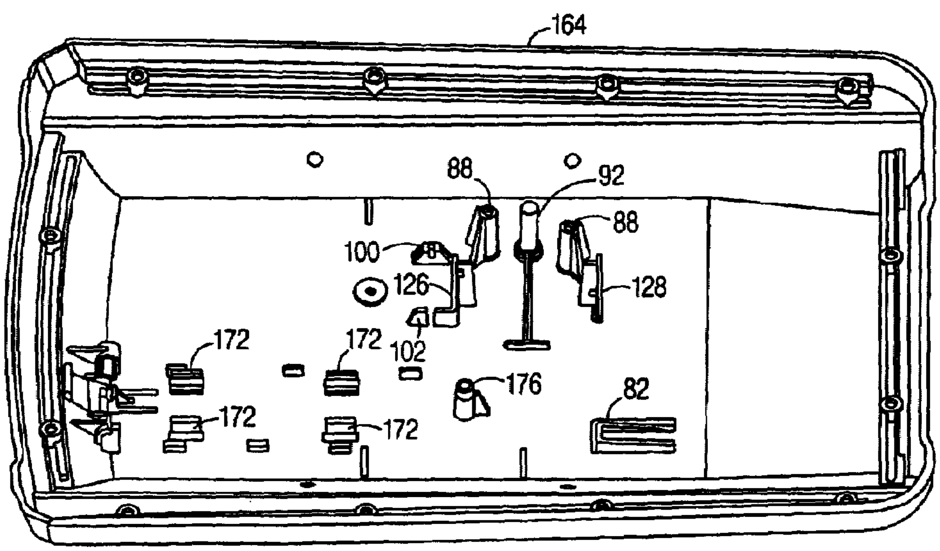
FIG. 8 is a perspective view of the substrate or armrest support member.

Referring to FIGS. 6, 10, and 11, a latch spring 184 is attached to armrest substrate 164, preferably in a press-fit manner. A biasing member (shown as a straight wire slider spring 186) is coupled to substrate 164 and slider 166. An end of slider spring 186 is coupled to flange 72. The other end slider spring 186 is coupled to a projection 100 extending from bottom side of substrate 164. Preferably, the middle portion of slider spring 186 is disposed between a pair of projections forming a slot 102 extending from substrate 164. Latch spring 184 and slider spring 186 is configured to return latch 130 and slider 166 to their original position when cycled and released (e.g., working together, separately, or the like).

Figure 12:
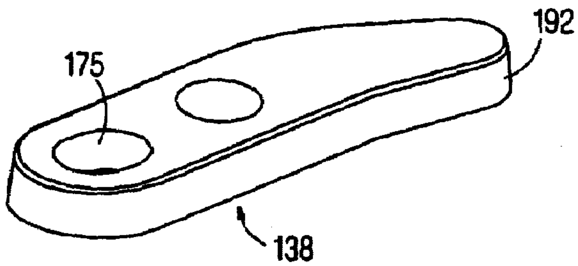
FIG. 12 is a perspective view of the cam link or actuator.

Referring to FIGS. 6, 11, and 12 cam link or actuator 138 is coupled to substrate 164 and slider 166. (Preferably cam actuator 138 is fixed to substrate 164 by a fastener such as screws, bolts, rivets, or the like, but may alternatively be attached by any of a variety of mechanism or press-fit interfaces). Cam actuator 138 rotates about a fixed boss 176 on substrate 164 when slider 166 moves forward. According to a preferred embodiment, cam actuator 138 includes a slot 175 that is configured to allow the cam actuator 138 to move (e.g., translate) generally perpendicular to rail 190. Such a slotted construction is intended to accommodate assembly tolerances, to improve the frictional engagement of the cam surfaces and the rail.

Figure 14:
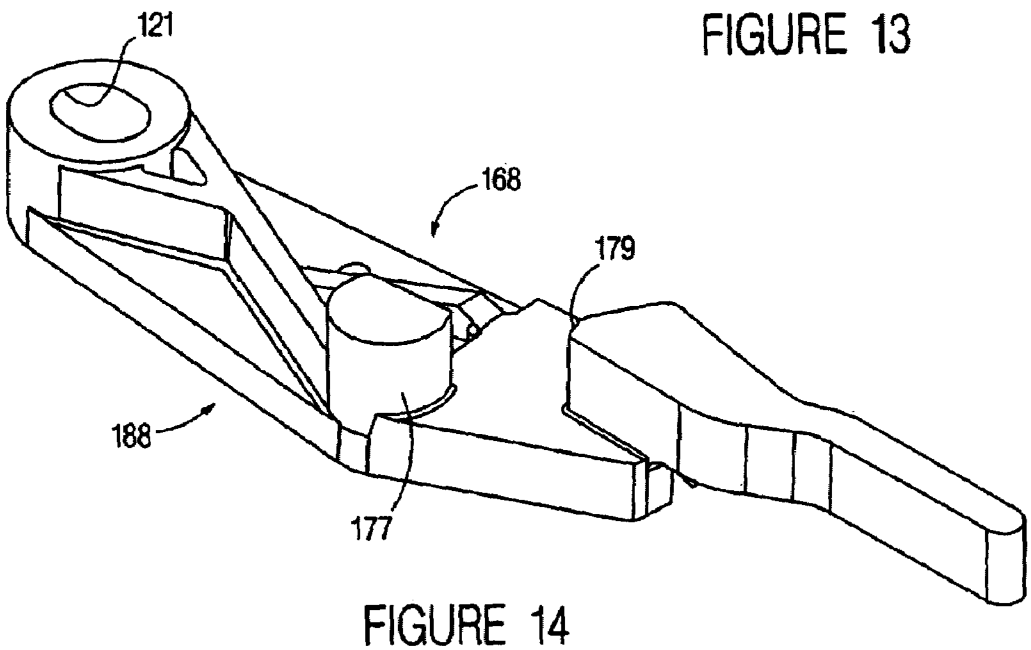
FIG. 14 is a perspective view of the cam.

Referring to FIGS. 6, 11, and 14 cams 168, 188 (e.g., levers, or the like) are mounted to substrate 164. Cams 168, 188 provides one half of the locking mechanism. Each cam 168, 188 locks against a rail 190 in one direction (one forward, one rearward) when the system is at nominal design position. When the system is activated, each cam 168, 188 rotates about fixed boss 92 on substrate 164 and loses contact with rail 190 allowing the system to slide freely fore and aft. Cams 168, 188 include a plurality of cam or bearing surfaces 177, 179, which are configured to selectively engage rail 190.

A cam surface 192 (shown at the end of actuator 138) bears against and activates/releases the front cam 188. The rear cam 168 is activated/released by a projection 134 extending from the end of slider 166. According to a preferred embodiment, bosses 90 of upper and lower cam members 168, 188 include elliptical slots 121 (shown in FIG. 14) that receive an axle.

Slots 121 is configured to allow the cam member to move (e.g., translate) generally perpendicular to rail 190. Such a slotted construction is intended to accommodate assembly tolerances, to improve the frictional engagement of the cam surfaces and the rail. According to a particularly preferred embodiment, upper cam member 168 and lower cam member 188 are configured to rotate about the axis of rail 190 (i.e., due to pivoting about an axle and movement in slot 121).

Referring to FIG. 11 cam springs 122, 124 is configured to keep each cam 168, 188 pulled against rail 190 when the system is at nominal design position. When the system is activated, these cam springs 122, 124 stretch as cams 168, 188 move. When latch 130 is released, these cam springs 122, 124 will help return cams 168, 188 to their home position against rail 190.

Figure 15:
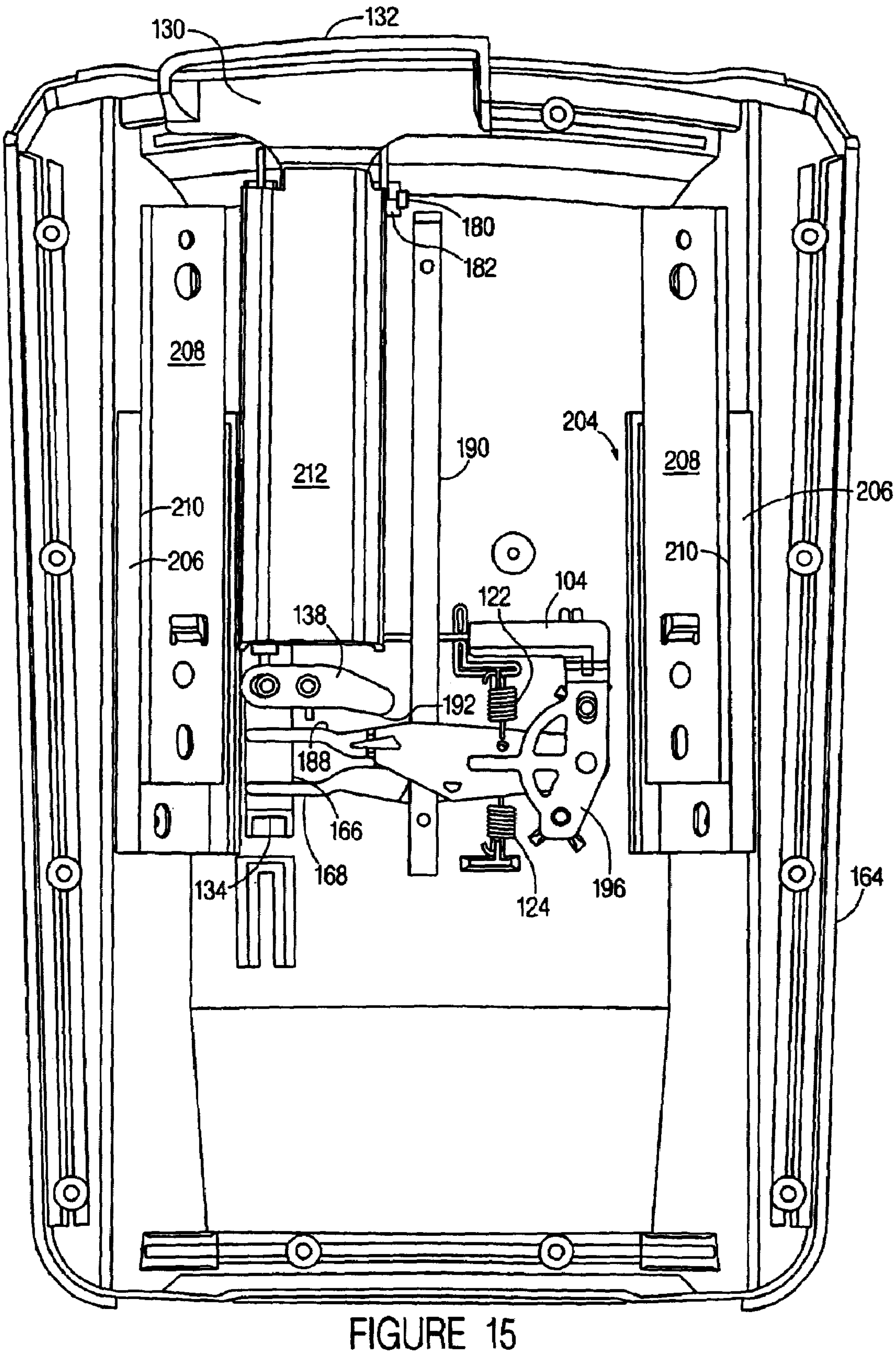
FIG. 15 is a top plan view of a slide cover, cam pivot bracket, and guides mounted to the bottom side of the armrest support member.
Figure 17:
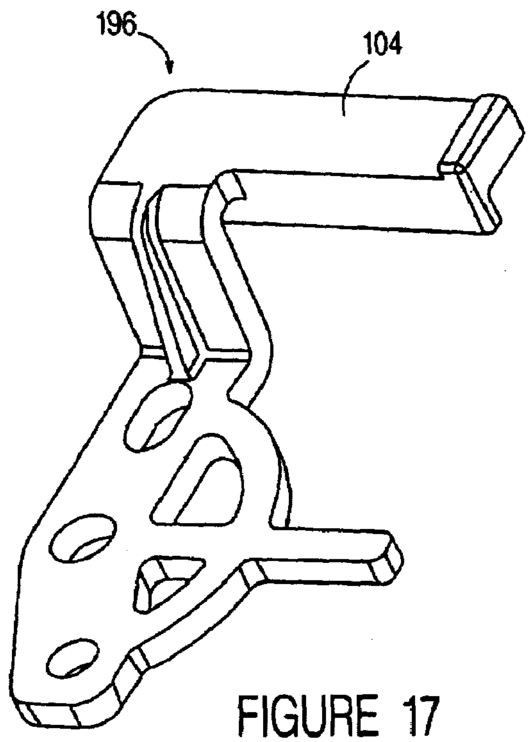
FIG. 17 is a perspective view of the cam pivot bracket.

Referring to FIGS. 15 and 17, a cam pivot bracket 196 is coupled to bosses 88 extending from substrate 164 (e.g., by a fastener such as a screw or rivet, a press-in engagement, bonding or welding, etc.). Cam pivot bracket 196 is configured to hold both cams 168, 188 and slider spring 186 to substrate 164. Bracket 196 includes an arm 104 extending below and towards latch 130. Arm 196 is configured to keep slider spring 186 in projection 100 and slot 102.

Referring to FIG. 15, a stationary member (shown as bar or rail 190) is configured to provide the second half of the release mechanism. Rail 190 mounted in recesses 198, 200 in a liner 202 and stays stationary throughout the sliding movement of the armrest support member. When cams 168, 188 are released from rail 190, they will travel fore/aft around rail 190 until latch 130 is released and cams 168, 188 return their contact to-engagement with rail 190.

Figure 18:
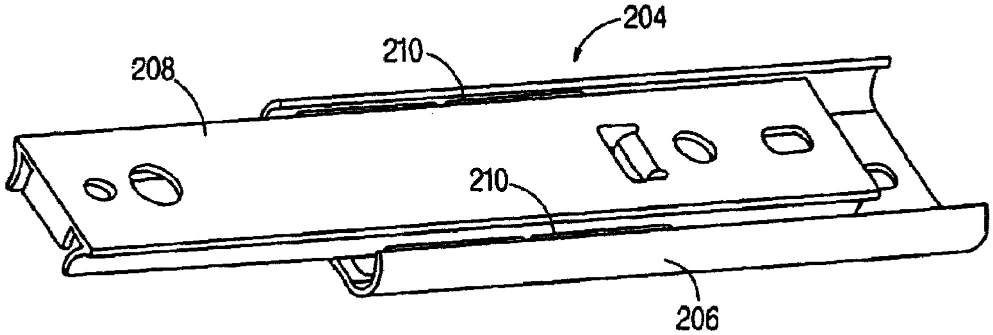
FIG. 18 is a perspective view of the slider assembly or guide.

Referring to FIGS. 15 and 18, substrate 164 is also slidably coupled to liner 18 by a pair of slider assemblies (shown as slider tracks or guides 204) configured to provide for smooth movement of substrate 164 relative to liner 18, and to provide support for forces exerted on armrest—particularly when substrate 164 is in the forward/extended/deployed position. Guides 204 includes a first track 206 coupled to substrate 164, a second track 208 coupled to liner 202, and a bearing 210 located between first track 206 and second track 208. Guides 204 bridges between the fixed and sliding portions of the armrest support member. Guides 204 carries the moving portion of the armrest support member forward and aft during cycling. Also, the material selection and particular guide design is dependent on the desired strength and the intended performance of the adjustable armrest. Further, the guide mechanisms or slide assemblies may be any of a variety of devices or designs configured to provide a sliding or lateral translational movement (e.g., dove-tail joint, conventional door or drawer slides, greased (or ungreased) member on member interface (e.g., plastic on plastic, plastic on metal, metal on metal, etc.), pneumatic or hydraulic cylinder, and the like.

Figure 16:
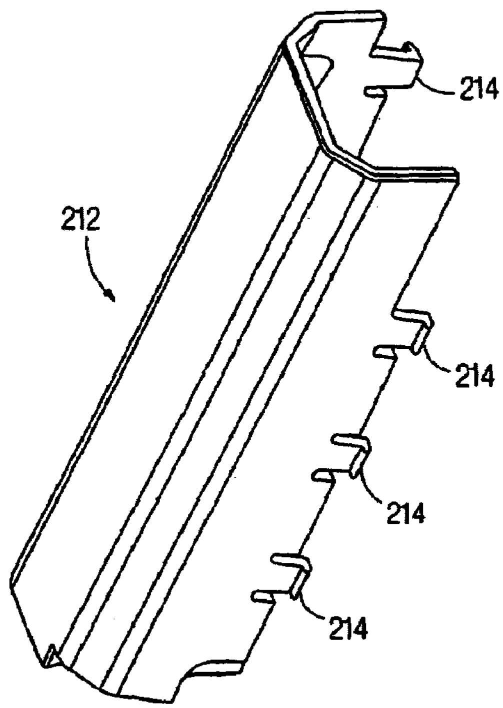
FIG. 16 is a perspective view of the slider cover.

Referring to FIGS. 15 and 16, a slide cover 212 is mounted to substrate 164 and is configured to cover at least a portion of sliding latch 130 and slider 166 to protect the system and provide a positive over rotation stop for sliding latch 130. According to a preferred embodiment, a plurality of projections 214 extending from cover 212 provide a snap fit attachment. According to alternative embodiments, any of a variety of attachment or mounting methods can be used (e.g., fasteners, bonding, adhesive, heat staking, welding, etc.).

Figure 19:
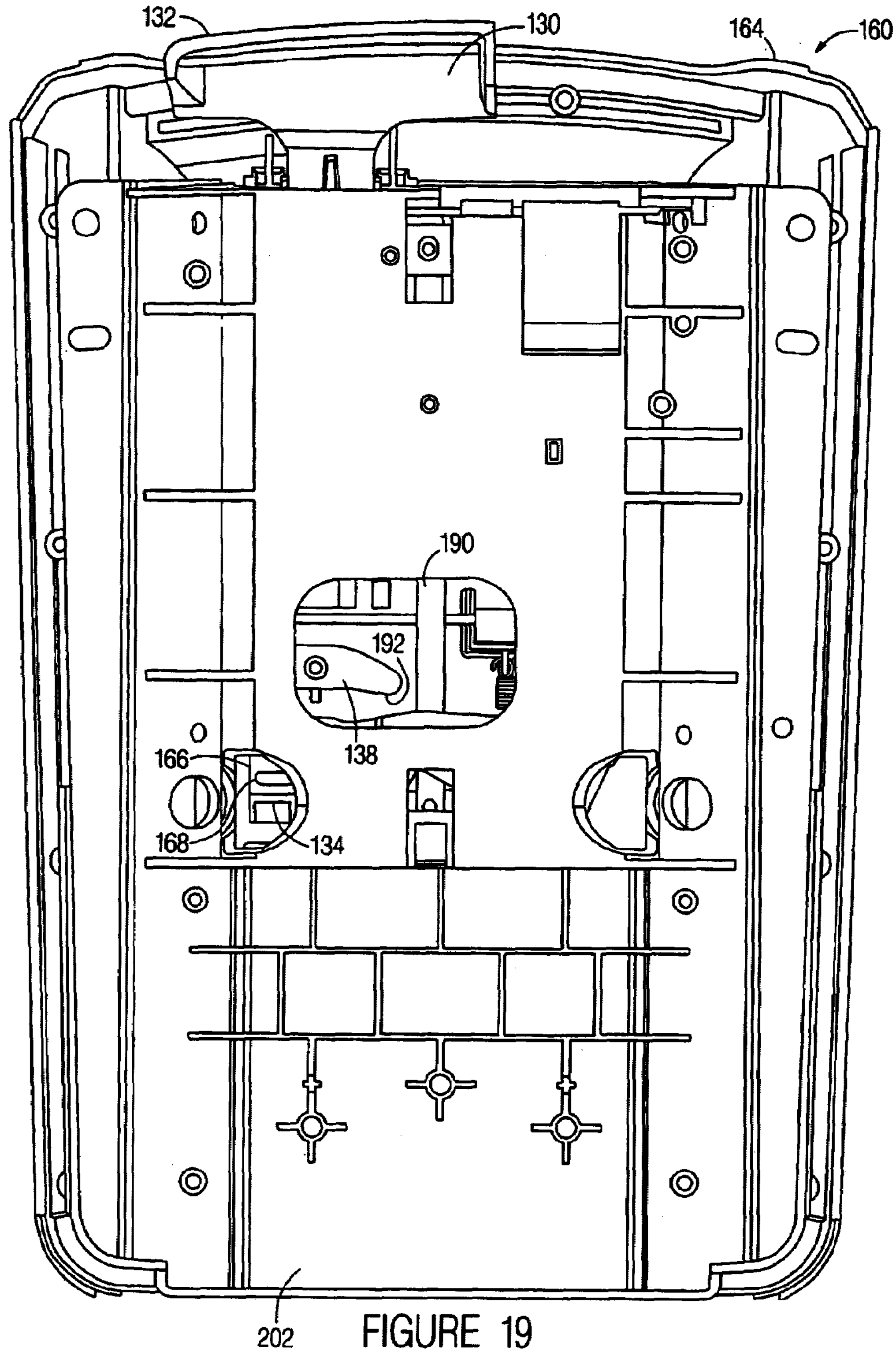
FIG. 19 is a top plan view of a liner mounted to the substrate or armrest support member.
Figure 20:
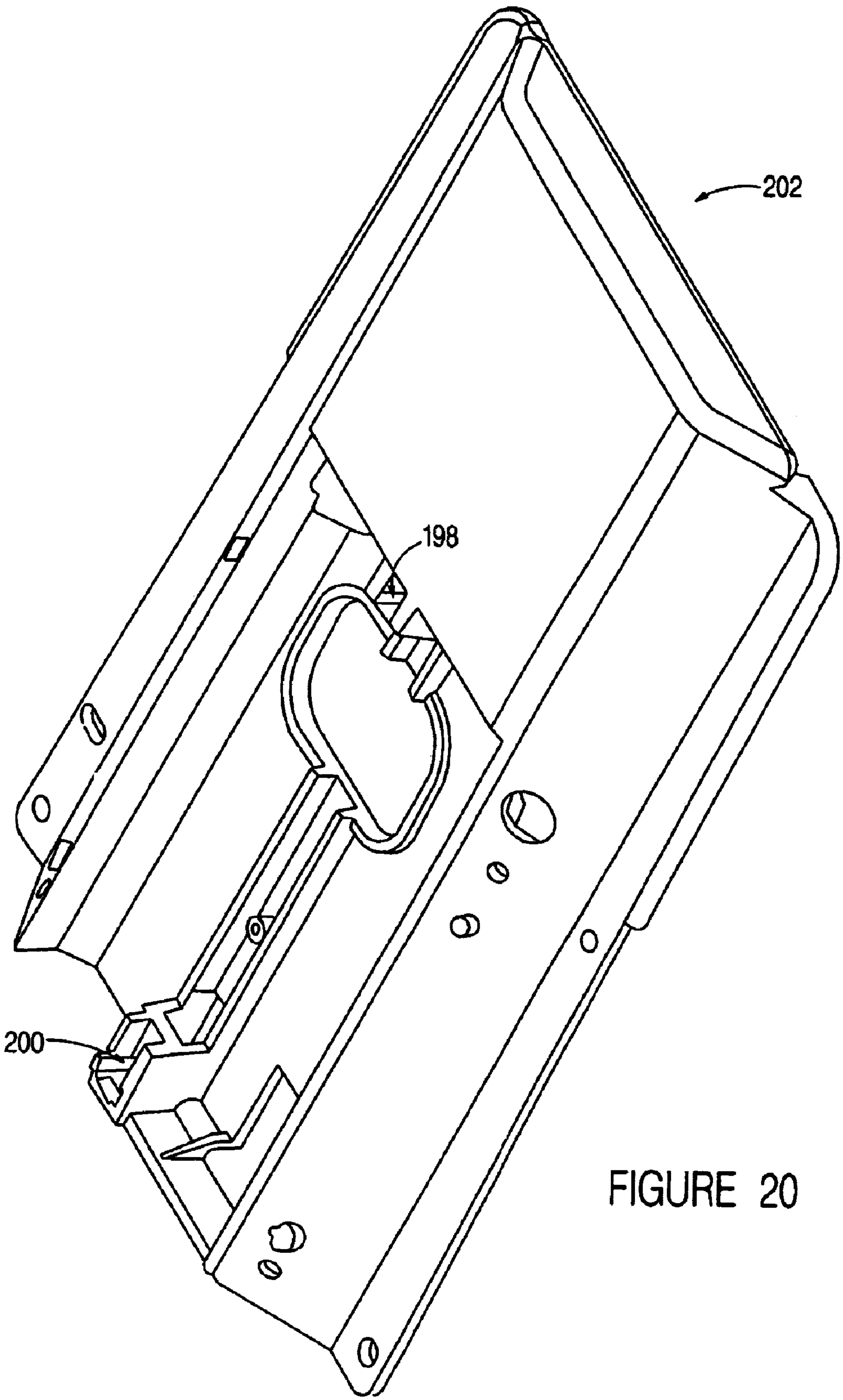
FIG. 20 is a perspective view of the liner.

Referring to FIGS. 15, 19, and 20, liner 202 is attached to rail 190 and guides 204 and provides the stationary portion of the armrest support member. When mounted in a vehicle, for example, liner 202 may be mounted to a center console or other support surface. Alternatively, the armrest support member may be mounted directly to the center console or other support surface.

During operation, armrest assembly 160 may be moved between the stowed and deployed position by a single action of latch 130. Latch 130 is actuated by the user resting his/her palm on the armrest cover 32 and gripping a handle 132 of latch 130 with his/her fingers and squeezing to lift handle 132. By lifting handle 132, handle pivots about a first pivot point 133 so that a pivot member 135 pivots relative to a second pivot point 137 to slide a middle portion 70 and flange 72. As flange 72 slides forward, projection 134 applies a force to an arm of cam 168 and link or actuator 138 rotates to apply a force to an arm of cam 188 member (e.g., in a scissors action to pinch the cam arms).

Actuator 138 is attached to flange 72 (e.g., by a fastener, or the like) and to boss on 176 on the bottom surface of substrate 164. Actuator 138 includes a cam surface 192 that engages the arm of cam 188. One of the apertures in actuator 138 may be slotted to allow for translational movement of actuator 138 during actuation. Pinching of the cam arms actuates the cam mechanism to displace both arms so that the friction force inhibiting both forward and rearward movement of the armrest support member. Such an embodiment is intended to provide improved human factors and reduced user concentration for operation of the cam release mechanism. Biasing members (shown as springs 122) may be included to bias the latches in a neutral position.

Figure 21:
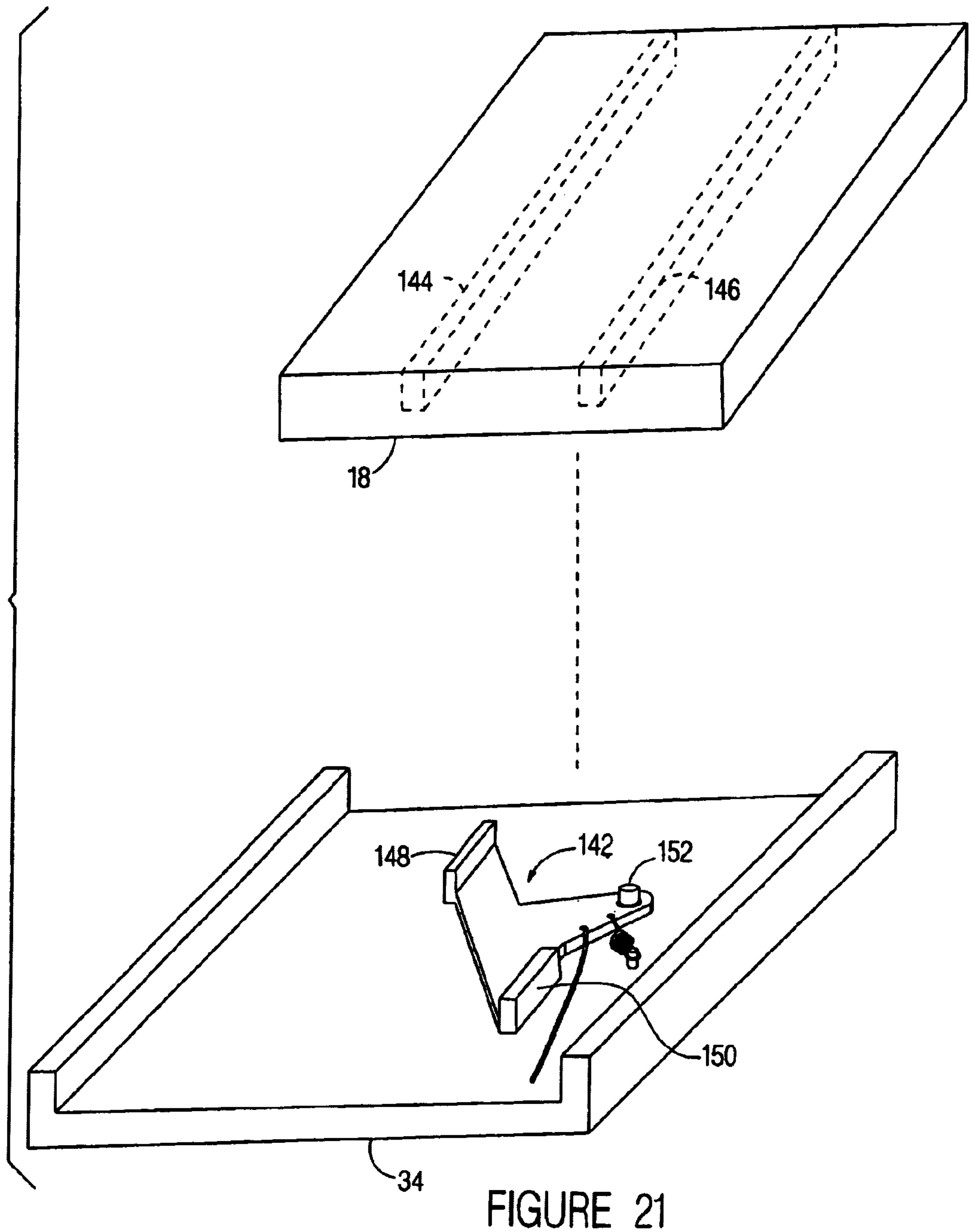
FIG. 21 is a partially exploded perspective view of the adjustable armrest according to an alternative embodiment.
Figure 22:
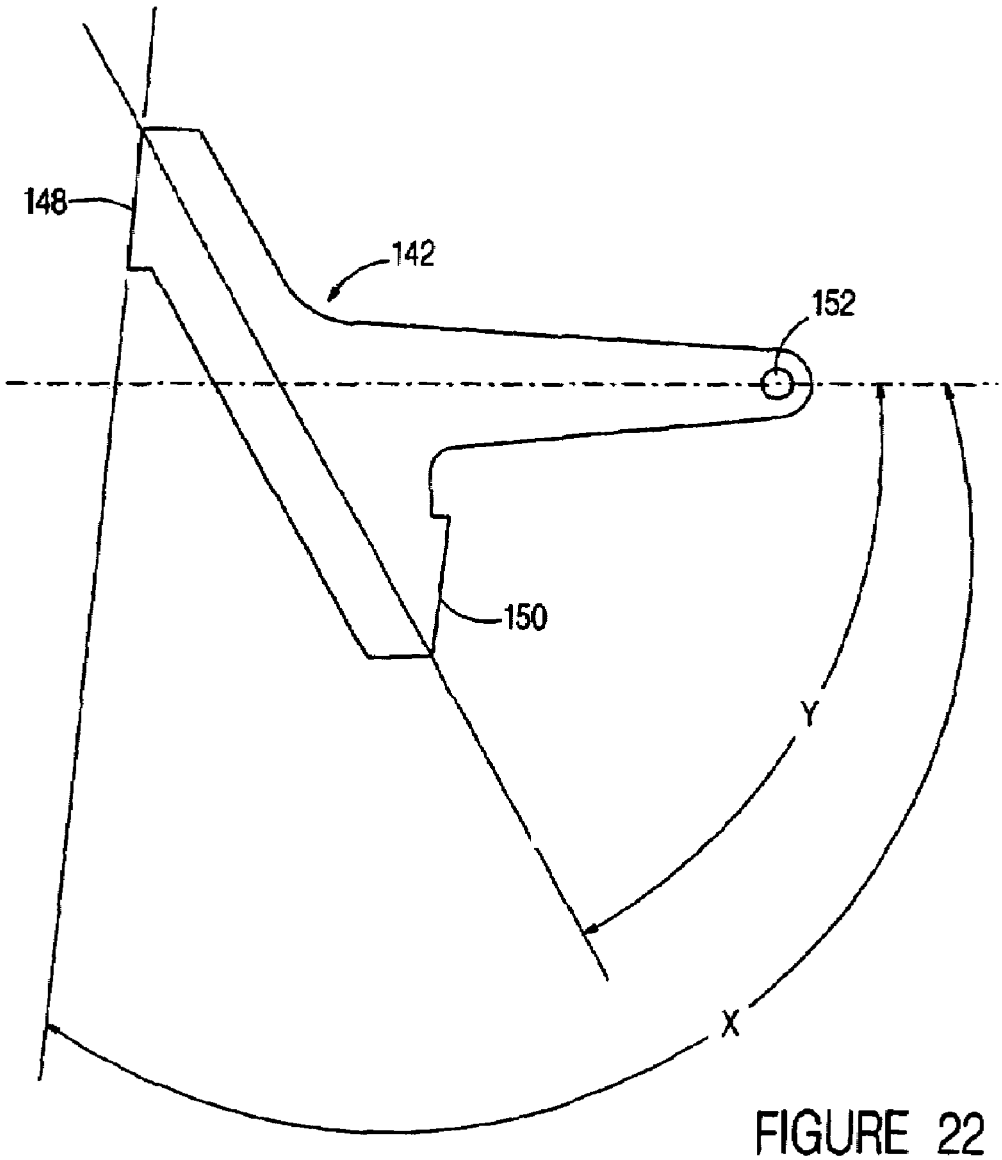
FIG. 22 is a top plan schematic view of a cam member for the adjustable arrest of FIG. 21.
Figure 23:
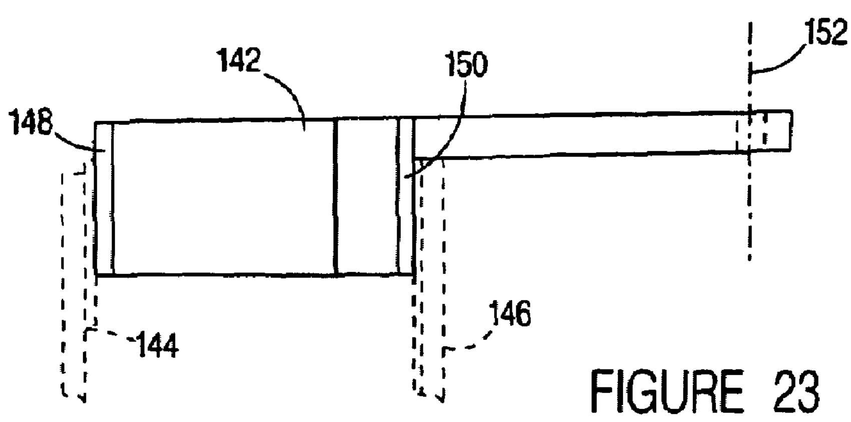
FIG. 23 is a side schematic view the adjustable armrest of FIG. 21.

According to yet another alternative embodiment shown in FIGS. 21–23, the adjustable armrest includes a cam mechanism 140 having a single cam member 142 disposed between a pair of rails 144, 146. Cam member 142 includes a pair of cam surfaces 148, 150 that engage surfaces of rails 144, 146. As cam member 142 rotates about an axis 152, friction force between cam surfaces 148, 150 and surfaces of rails 144, 146 reduces so that armrest assembly 16 is movable between the forward extended or stowed and rearward retracted deployed position. Preferably, an angle X provided by the cam surfaces 148 are between 90 degrees and 100 degrees, and more preferably about 96 degrees. Also preferably, the body of cam member 142 provides an angle Y that is between about 55 degrees and 65 degrees relative to the pivot point or axis 152, and more preferably about 60 degrees. As such, the adjustable armrest includes a single cam with a pair of cam surfaces that releasably engage a pair of rails to frictionally retain the armrest support member at any point along a range of movement thereof. The single cam includes a pivot axis and a body member connecting the pair of cam surfaces, the body member being angled relative to the pivot axis between about 55 and 65 degrees, and the pair of cam surfaces being angled between about 90 degrees and 100 degrees from the pivot axis.

Figure 24:
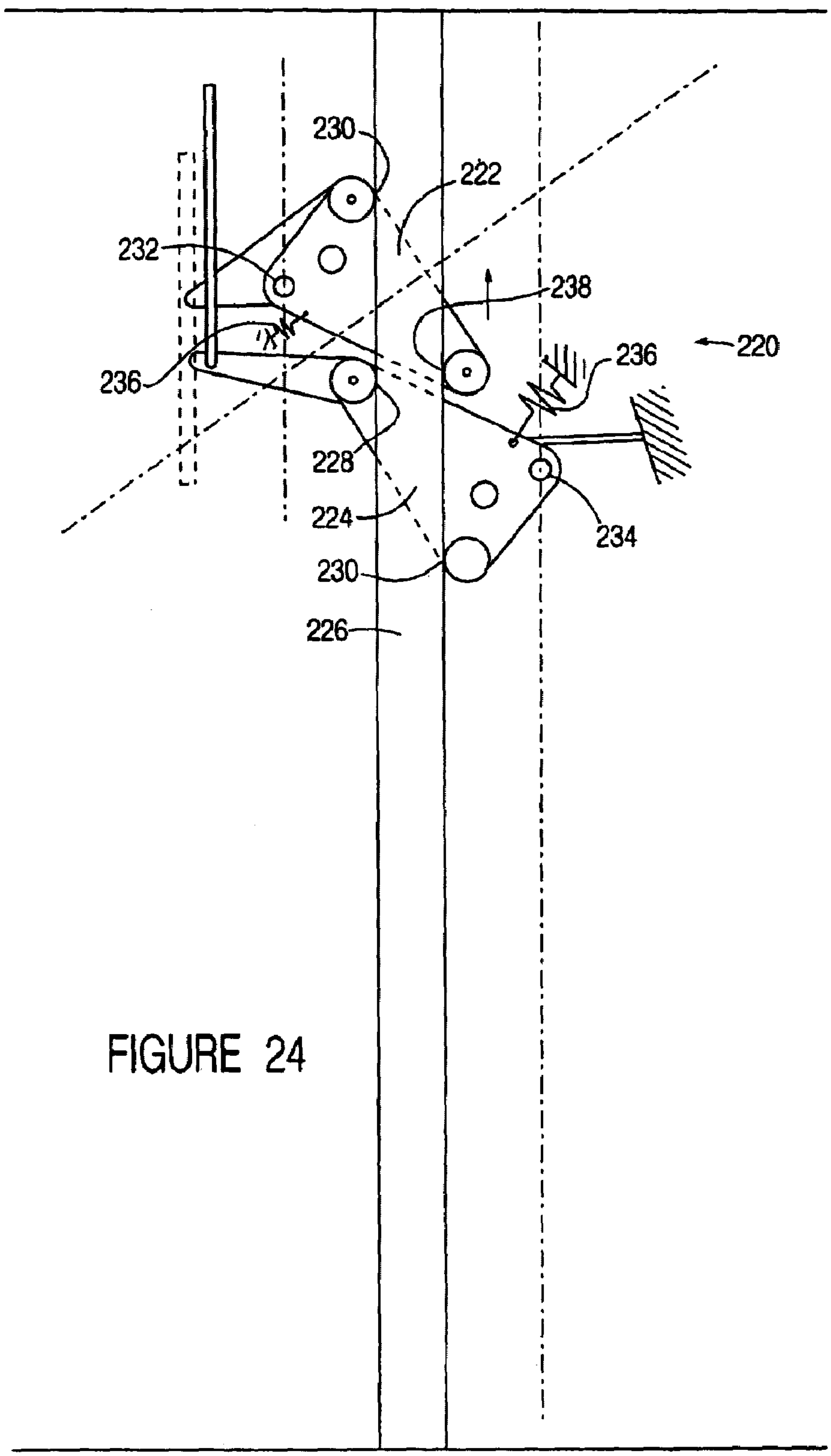
FIG. 24 is a fragmentary top plan schematic view the adjustable armrest according to an alternative embodiment.
Figure 25:
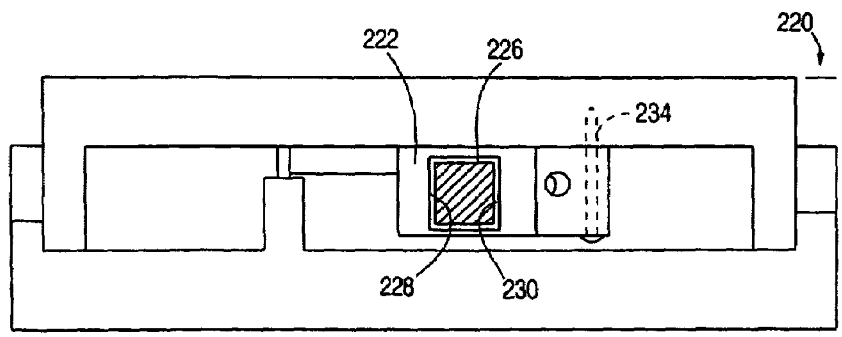
FIG. 25 is a sectional schematic view the adjustable armrest of FIG. 24.
Figure 26:
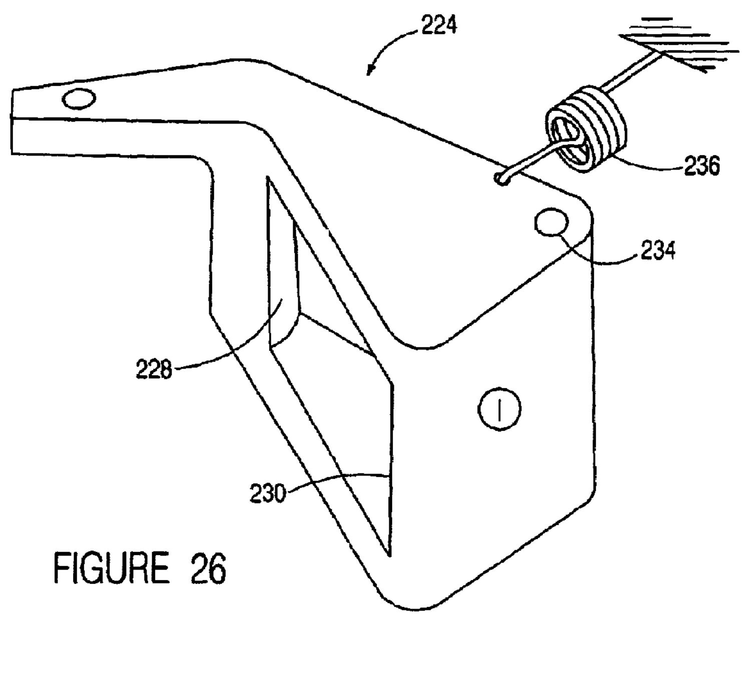
FIG. 26 is a perspective view of a cam member for the adjustable arrest of FIG. 24.

According to yet another alternative embodiment shown schematically in FIGS. 24–26, the adjustable armrest includes a cam mechanism 220 having a pair of cam members 222, 224 and a rail 226 engaged therewith. Cam members 222, 224 includes a cam surfaces 228, 230 that engage surfaces of rail 226. As cam member 222 rotates about an axis 232 and cam member 224 rotates about an axis 234, friction force between cam surfaces 228, 230 and surfaces of rail 226 reduces so that the armrest assembly is movable between the forward extended or stowed and rearward retracted deployed position. As such, the adjustable armrest includes a pair of cams, each having a passage defined by a pair of cam surfaces that releasably engage a single rail to frictionally retain the armrest support member at any point along a range of movement thereof. Cam members 222, 224 are biased in an engaged position by a spring 236 or other biasing member.

It is also important to note that the construction and arrangement of the elements of the adjustable armrest as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, any of a variety of latches or release mechanisms may be used to release the armrest (e.g., sliding latch, squeezed latch, etc.). Also, the cam or release mechanism can be configured to be operated in any of a variety of ways (e.g., one-way operation such as a squeeze grip, a two-way operation so that the user moves the user interface in the direction of the desired movement of the armrest support member, and the like). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A vehicle armrest mounted to a base, the armrest comprising:

an armrest support member adapted to be coupled to the base, the armrest support member movable in a linear direction between a first position and a second position;

a release mechanism configured to selectively engage the armrest support member to retain the armrest support member between the first position and the second position, the release mechanism including a rail and at least one cam member configured to pivot between an engaged position with the rail and a disengaged position with the rail;

wherein the armrest support is movable between the first position and the second position when the at least one cam member is in the disengaged position;

wherein the first position is a forward position and the second position is a rearward position.

2. The armrest of claim 1 wherein the armrest support member is frictionally retained at any point along a range of movement thereof.

3. The armrest of claim 2 wherein the release mechanism comprises a pair of cam members that releasably and variably engage the rail.

4. The armrest of claim 3 wherein the pair of cam members are biased to frictionally engage the rail.

5. The armrest of claim 3 wherein the pair of cam members each comprise a first cam on a first side of the rail and a second cam on a second side of the rail opposite the first side.

6. The armrest of claim 1 wherein the release mechanism comprises a user interface that is movable between an actuated position and a neutral position, wherein the actuated position pivots the at least one cam member so that a surface on the at least one cam member pivots away from its engagement with the rail.

7. The armrest of claim 6 wherein the user interface is biased in the neutral position.

8. The armrest of claim 6 wherein the actuated position is in a direction substantially the direction of the desired movement of the armrest support member.

9. The armrest of claim 8 wherein the actuated position is a forward position whereby the armrest support member is movable toward the forward position.

10. The armrest of claim 6 wherein the user interface is at least partially recessed in at least one of the base and the armrest support member.

11. The armrest of claim 6 wherein the user interface is operated by a user gripping the user interface and pivoting it toward the actuated position proximate the armrest support member.

12. The armrest of claim 11 wherein the user interface is pivoted by squeezing it toward the actuated position proximate the armrest support member.

13. The armrest of claim 1 further comprising one or more guides mounted to the base and slidably coupled to the rail.

14. A vehicle console comprising:

a base;

an armrest support member coupled to the base and movable in a linear direction between a first position and a second position;

a release mechanism configured to selectively engage the armrest support member to retain the armrest support member between the first position and the second position, the release mechanism including a rail and at least one cam member configured to pivot between an engaged position with the rail and a disengaged position with the rail;

wherein the armrest support is movable between the first position and the second position when the cam member is in the disengaged position;

wherein the armrest support member is frictionally retained at any point along a range of movement thereof.

15. The vehicle console of claim 14 wherein the release mechanism comprises a pair of cam members that releasably engage the rail.

16. The vehicle console of claim 15 wherein the pair of cam members are biased to frictionally engage the rail.

17. The vehicle console of claim 15 wherein the pair of cam members each comprise a first cam on a first side of the rail and a second cam on a second side of the rail opposite the first side.

18. The vehicle console of claim 14 wherein the release mechanism comprises a user interface that is movable between an actuated position and a neutral position.

19. The vehicle console of claim 18 wherein the user interface is biased in the neutral position.

20. The vehicle console of claim 18 wherein the actuated position is in a direction substantially the direction of the desired movement of the armrest support member.

21. The vehicle console of claim 18 wherein the user interface is operated by a user gripping the user interface and pivoting it toward the armrest support member.

22. The vehicle console of claim 14 wherein the base is one of a console and a liner.

23. The armrest of claim 14 wherein the armrest is selectively positionable between a forward position and a rearward position.

24. A method of inhibiting the movement of a vehicle armrest that includes a base and an armrest support member movable between a forward position and a rearward position, the method comprising:

providing a release mechanism having a user interface and a cam member reasonably engageable with a rail;

operating the user interface pivots the cam to disengage the rail so that friction is reduced between the cam and the rail sufficient to permit movement of the armrest support member;

moving the armrest support member between the forward position and the rearward position;

releasing the user interface whereby the cam pivots to engage the rail to applies sufficient friction to inhibit movement of the armrest support member.

25. The method of claim 24 wherein the armrest support member is positionable at any point along a range of movement thereof.

26. The method of claim 25 wherein the friction may be applied continuously along the range of movement of the armrest support member.

27. The method of claim 24 wherein the step of operating the user interface to reduce friction comprises applying a first force to the user interface in a direction substantially the direction of the desired movement of the armrest support member.

28. The armrest of claim 24 wherein the step of operating the user interface to reduce friction comprises gripping the user interface and pivoting it toward the armrest support member.

29. The armrest of claim 28 wherein the step of operating the user interface to reduce friction comprises squeezing it toward the armrest support member.

* * * * *